United States Patent [19]

Sielaff et al.

[11] Patent Number: 6,075,207

[45] Date of Patent: Jun. 13, 2000

[54] OUTDOOR HOUSING

[75] Inventors: Michael Sielaff; Frank Czogalla, both of Berlin, Germany

[73] Assignee: Krone GmbH, Germany

[21] Appl. No.: 09/036,459

[22] Filed: Mar. 6, 1998

[30] Foreign Application Priority Data

Mar. 7, 1997 [DE] Germany .......................... 197 09 460

[51] Int. Cl.[7] .................................................. H05K 5/06
[52] U.S. Cl. ........................................ 174/50.5; 220/3.92
[58] Field of Search ............................. 174/50, 37, 50.5; 220/3.92, 3.94, 4.02

[56] References Cited

U.S. PATENT DOCUMENTS

| | | | |
|---|---|---|---|
| 2,345,792 | 4/1944 | Cann | 174/50 X |
| 3,482,895 | 12/1969 | Becklin | 174/50 X |
| 3,618,804 | 11/1971 | Krause | 220/3.92 X |
| 4,313,025 | 1/1982 | Grube, Jr. | 174/50 |
| 5,894,106 | 4/1999 | Schwenk et al. | 174/50 |

FOREIGN PATENT DOCUMENTS

| | | |
|---|---|---|
| 1 947 399 | 3/1971 | Germany . |
| 74 21 749 | 11/1974 | Germany . |
| 23 47 633 | 8/1975 | Germany . |
| 37 09 875 C2 | 10/1988 | Germany . |
| 93 07 001 | 8/1993 | Germany . |
| 94 04 555 | 8/1995 | Germany . |
| 44 37 122 C2 | 4/1996 | Germany . |
| 195 45 448 | 6/1997 | Germany . |
| 1 418 159 | 12/1975 | United Kingdom . |

Primary Examiner—Dean A. Reichard
Attorney, Agent, or Firm—McGlew and Tuttle, PC

[57] ABSTRACT

An outdoor housing for accommodating electronics, in particular components for telecommunications and data technology. The electronics are surrounded in a hermetically sealed manner by a first, inner housing structure and a second, outer housing structure being arranged on the inner housing structure in such a manner that a cavity is formed between the housing structures. The second, outer housing structure are formed by hollow-section rails which are detachably attached to the first, inner housing structure.

15 Claims, 3 Drawing Sheets

OUTDOOR HOUSING

FIELD OF THE INVENTION

The invention relates to an outdoor housing for accommodating electronics, in particular components for telecommunications and data technology. The electronics are enclosed in a hermetically sealed manner by a first housing structure, and a second outer housing structure is arranged on the first inner housing structure in such a manner that a cavity is formed between the housing structures.

BACKGROUND OF THE INVENTION

The known outdoor housings for accommodating electronics can be designed in a hermetically sealed manner in order to protect the electronics located in the interior against interfering electromagnetic radiation and other environmental influences, such as rain. However, the electronics arranged in the interior of the outdoor housing produce an electrical power loss, which is emitted in the form of heat. This heat in turn has negative effects on the operation of the electronics and therefore has to be dissipated in some way, despite the hermetically sealed housing structure. Two alternative solutions are known for this purpose from the prior art. On the one hand, double-walled housings are used and, on the other hand, a second, outer housing is arranged around the inner housing in such a manner that a cavity is formed between the housing structures. The principle of heat dissipation is common to both solutions. The air flowing through the cavity absorbs part of the heat and rises upward (chimney effect). The heated air can be carried out there via air shafts or gaps. In the event of external heating, for example by direct solar radiation, the layer of air furthermore acts as a heat insulator. A disadvantageous feature of the known outdoor housings is their lack of flexibility with regard to different external boundary conditions. For example, if the outer housing structure is damaged or destroyed, it is necessary to replace it, entirely or partially. In addition, because of the continuous increases in transmission capacities, it is necessary to install new outdoor housings or to upgrade existing housings. Repairs, conversion or reinstallation mean that the previously used inner and outer housing structures, or the double-walled housings used, cannot be reused because of damage to them or because of their geometric dimensions. Also attention is now being paid to achieving a harmonious overall aesthetic appearance in town areas. Outdoor housings, some of whose colors are completely inappropriate, remain a disturbing factor. If, for example when building a new estate, the color of the outdoor housings is matched to the facade color used, the problem is just delayed at the latest until the next facade renovation.

SUMMARY AND OBJECTS OF THE INVENTION

The primary object of the present invention is thus based on solving the technical problem of providing an outdoor housing which is simple to repair while having the same technical characteristics and which can be matched to different or changing external boundary conditions.

The technical problem is solved by forming the outdoor housing from an inner and outer housing, and by designing the outer housing structure as hollow-section rails. The hollow-section rails are detachably attached to the first, inner housing structure by an attachment means, and define a cavity through which the heat losses that occur can be dissipated. The cavity is known from the prior art. At the same time, once built, the outdoor housing can easily be repaired and can be matched in a flexible manner to changing boundary conditions. In the event of conversion or upgrading of an already existing outdoor housing, the hollow-section rails used can be reused, and additional hollow-section rails are just arranged on the new, inner housing. Any required color configurations can be produced very easily by using colored hollow-section rails. In addition, assembly of the outdoor housing is simplified since the hollow-section rails can be handled relatively easily, in contrast to the previously used, cumbersome housing structures. Further advantageous refinements of the invention result from the dependent claims.

The attachment means for the hollow-section rails of the present invention is formed in such a manner that it is not accessible from the outside in the installed state. This avoids manipulations and vandalism. Any known type of attachment may be used as the attachment means the hollow-section rails preferably being hooked onto the inner housing structure so that the outer surfaces of the hollow-section rails do not offer any indication of the attachment. In a preferred embodiment, the hollow-section rails are designed as twin rectangular hollow sections, which have particularly high strength in comparison with conventional hollow-section rails. Furthermore, the hollow-section rails can be designed with a holder for information media, such as advertising, public transport schedules or public notices, or else may themselves be designed as information media. For example, the housing may be used as a billboard. For design or engineering reasons, the hollow-section rails may have any required shape.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
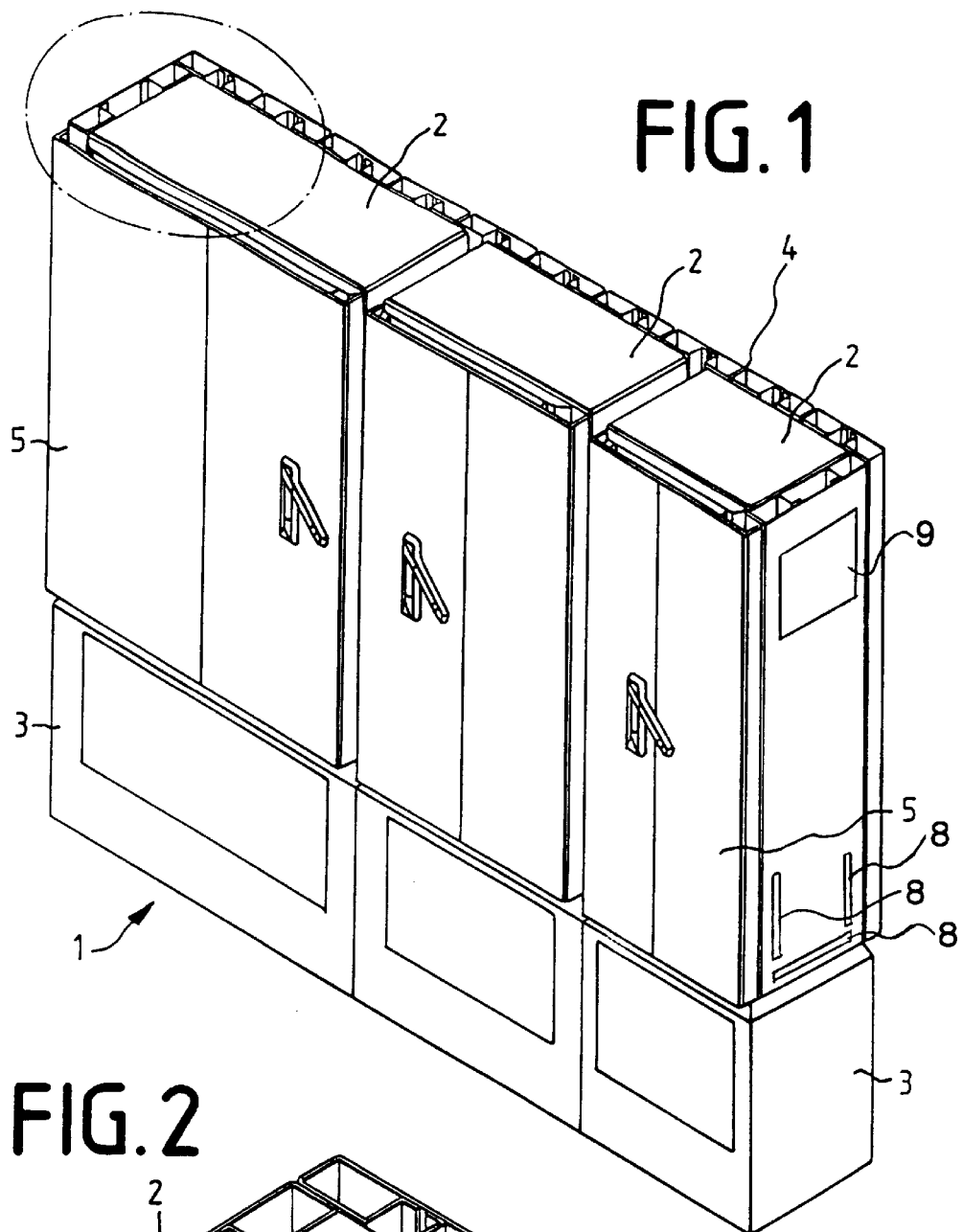
FIG. 1 is a perspective illustration of a modular outdoor housing.
Figure 2:
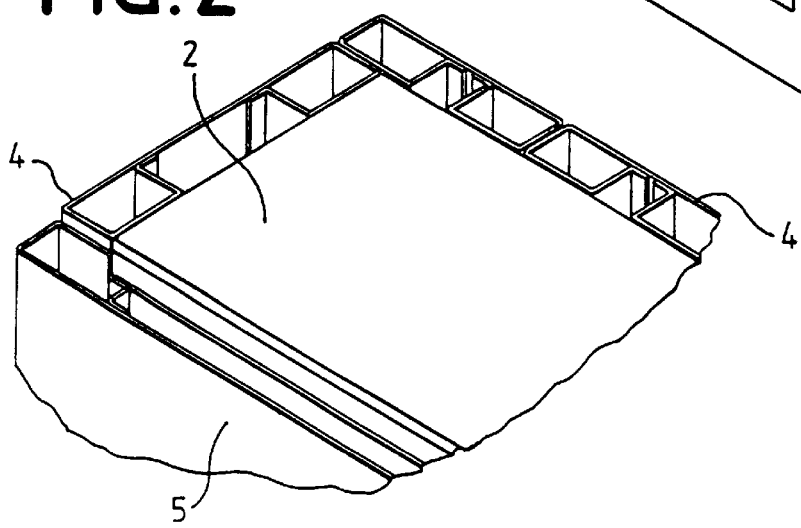
FIG. 2 is a view of a detail from FIG. 1.

An outdoor housing 1 is illustrated in perspective in FIG. 1. The outdoor housing 1 comprises three modules, each of which has its own inner housing 2. The area which contains the electrical components is arranged above a base 3, each module preferably being assigned its own base 3 and an integral base connection being arranged around the bases. The individual modules are separately accessible from the outside via doors 5 composed of hollow-section rails 4. For clarity, the outdoor housing 1 is illustrated without a roof. As can be seen in particular from FIG. 2, the hollow-section rails 4 are arranged abutting the inner housings 2 and are attached to them, the doors 5 being hinged on adjacent hollow-section rails 4 or on the inner housing 2 by means of hinges 6. A cavity is formed between the inner housings 2, which are all hermetically sealed, and the hollow-section rails 4 which form the outer housing structure. The heat losses produced in the inner housings 2 by the electrical components are transmitted via the outer walls of the inner housing 2 to the air in the cavity. The heated air rises upward and can leave the cavity via air shafts or air gaps between the walls and the roof, so that the heat losses that are produced are dissipated.

Figure 3:
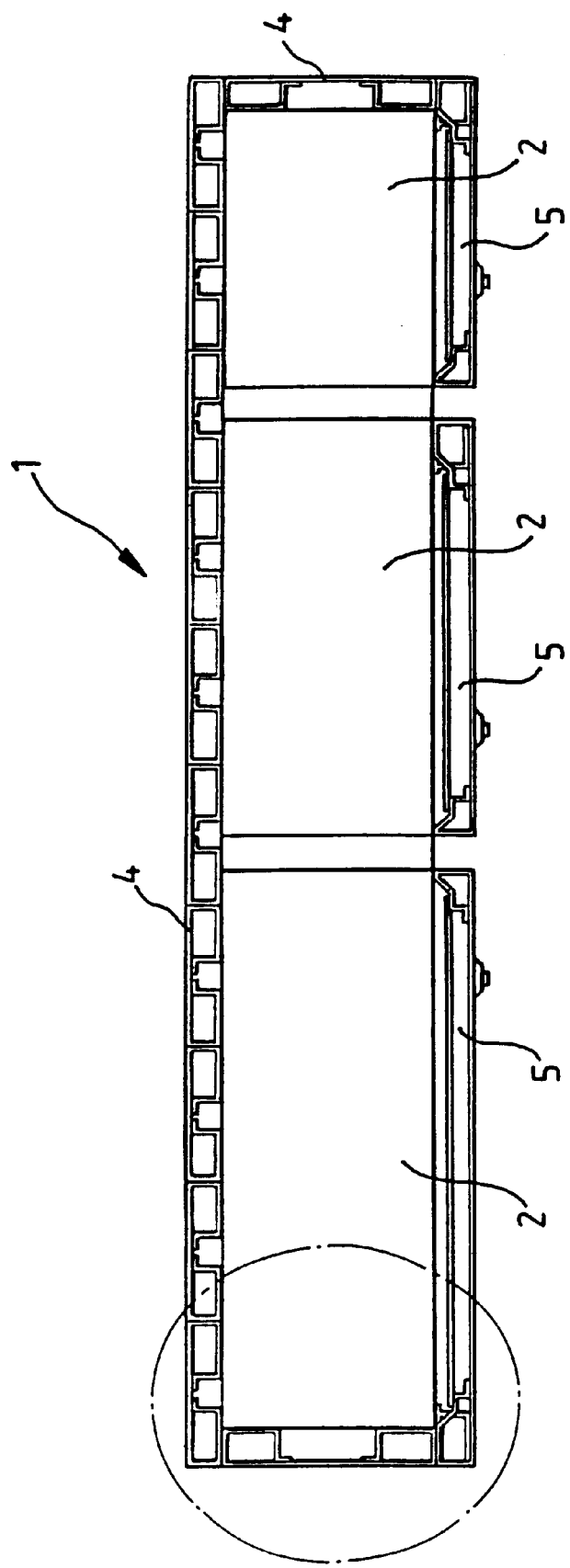
FIG. 3 is a plan view of the outdoor housing.
Figure 4:
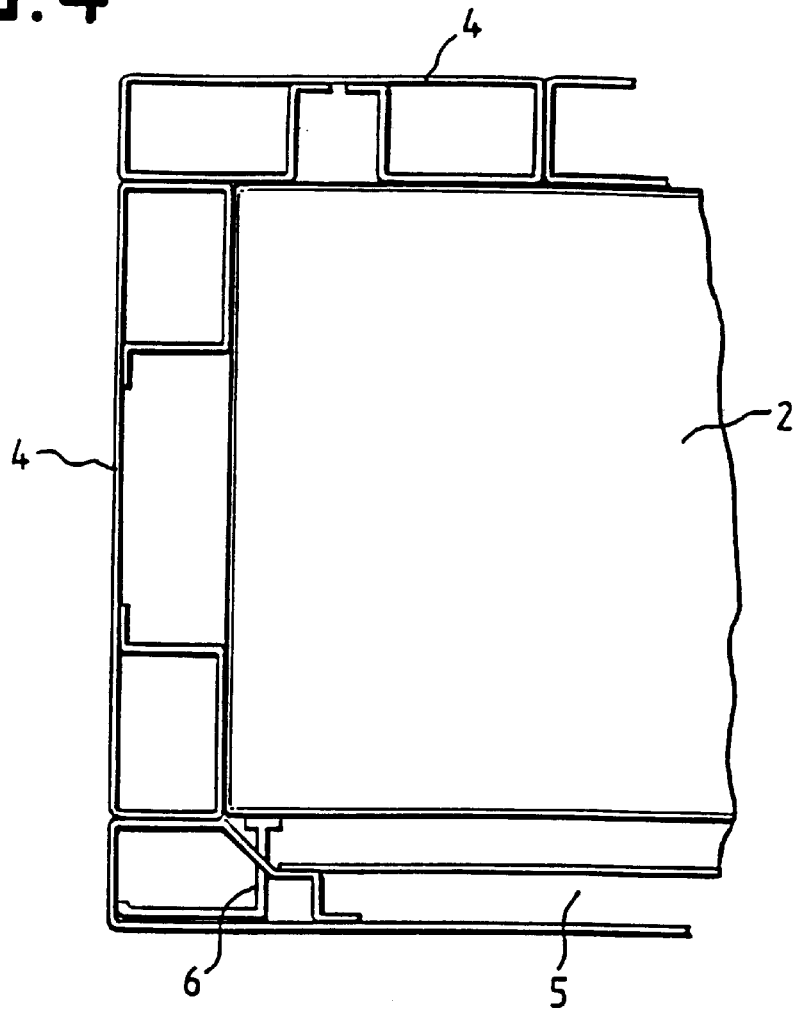
FIG. 4 is a view of a detail from FIG. 3.

FIG. 3 illustrates a plan view of the outdoor housing 1 without a roof, and FIG. 4 illustrates a view of a detail from FIG. 3. The hinge 6 is attached to the respective inner housing 2 and passes through a hollow-section rail 4.

Figure 5:
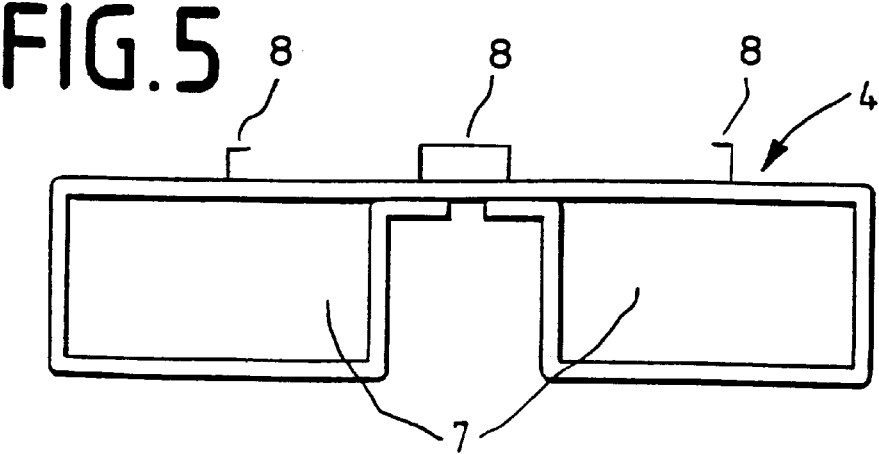
FIG. 5 is a plan view of a hollow-section rail.

FIG. 5 shows a plan view of a preferred embodiment of a hollow-section rail 4 as a twin-rectangular hollow section, which gives the outer housing structure particular strength, and in which case the rectangles 7 may have different geometric dimensions. The section rail 4 can have a holder 8 for holding information media or the section rail 4 can include the information media 9.

While specific embodiments of the invention have been shown and described in detail to illustrate the application of the principles of the invention, it will be understood that the invention may be embodied otherwise without departing from such principles.

What is claimed is:

1. An outdoor housing for accommodating electronics, the housing comprising:

an inner housing surrounding the electronics in a hermetically sealed manner;

an outer housing arranged on said inner housing to form a cavity between said inner and outer housings, said outer housing including hollow-section rails detachably attached to said inner housing, said outer housing being formed of a plurality of said hollow section rails arranged side by side.

2. The outdoor housing as claimed in claim 1, wherein:

walls, a door and a roof of the outdoor housing are formed from separate ones of said hollow-section rails.

3. The outdoor housing as claimed in claim 1, further comprising:

attachment means for attaching said outer housing to said inner housing, said attachment means being non-accessible from outside the outdoor housing when the outdoor housing is in an assembled state.

4. The outdoor housing as claimed in claim 2, further comprising:

attachment means for attaching said outer housing to said inner housing, said attachment means being non-accessible from outside the outdoor housing when the outdoor housing is in an assembled state.

5. The outdoor housing as claimed in claim 1, wherein:

each of said hollow-section rails are designed as a twin rectangular hollow section.

6. The outdoor housing as claimed in claim 2, wherein:

each of said hollow-section rails are designed as a twin rectangular hollow section.

7. The outdoor housing as claimed in claim 3, wherein:

each of said hollow-section rails are designed as a twin rectangular hollow section.

8. The outdoor housing as claimed in claim 1, wherein:

said hollow-section rails include holders for information media.

9. The outdoor housing as claimed in claim 2, wherein:

attachment means is provided for attaching said hollow section rails to said inner housing, said attachment means being non-accessible from outside the outdoor housing in an assembled state of the outdoor housing;

said hollow-section rails are designed as a twin rectangular hollow sections, and include holders for information media.

10. The outdoor housing as claimed claim 1, wherein:

said hollow-section rails include information media.

11. The outdoor housing as claimed in claim 2, wherein:

attachment means is provided for attaching said outer housing to said inner housing, said attachment means being non-accessible from outside the outdoor housing in an assembled state of the outdoor housing;

said hollow-section rails are designed as a twin rectangular hollow sections, and are formed as information media.

12. A housing in accordance with claim 1, wherein:

walls, a roof and a door of said outer housing are formed from a plurality of said hollow-section rails.

13. The outdoor housing as claimed in claim 1, further comprising:

attachment means arranged on said inner and outer housing for repetitively attaching and removing said section rails from said inner housing without significantly damaging said inner and outer housing, said attachment means blocking removal of said section rails from outside the outdoor housing when the outdoor housing is assembled.

14. An outdoor housing for accommodating electronics, the housing comprising:

an inner housing surrounding the electronics in a hermetically sealed manner;

an outer housing arranged on said inner housing to form a cavity between said inner and outer housings, said outer housing including hollow-section rails detachably attached to said inner housing to form, walls, a roof and a door of said outer housing each formed from a plurality of said hollow-section rails.

15. An outdoor housing for accommodating electronics, the housing, comprising:

an inner housing surrounding the electronics in a hermetically sealed manner;

an outer housing arranged on said inner housing to form a cavity between said inner and outer housings, said outer housing structure including hollow-section rails detachably attached to said inner housing each of said hollow-section rails are designed as a twin rectangular hollow section.

* * * * *